(12) United States Patent
Kang et al.

(10) Patent No.: US 10,168,838 B2
(45) Date of Patent: Jan. 1, 2019

(54) DISPLAYING AN OBJECT INDICATOR

(71) Applicant: Hewlett-Packard Development Company, L.P., Houston, TX (US)

(72) Inventors: Jinman Kang, San Diego, CA (US); Jordi Morillo Peres, Barcelona (ES); David Bradley Short, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 32 days.

(21) Appl. No.: 15/514,639

(22) PCT Filed: Sep. 30, 2014

(86) PCT No.: PCT/US2014/058189
§ 371 (c)(1),
(2) Date: Mar. 27, 2017

(87) PCT Pub. No.: WO2016/053269
PCT Pub. Date: Apr. 7, 2016

(65) Prior Publication Data
US 2017/0249054 A1    Aug. 31, 2017

(51) Int. Cl.
*G06F 3/042* (2006.01)
*G06F 3/00* (2006.01)
*G06F 3/01* (2006.01)

(52) U.S. Cl.
CPC ............ *G06F 3/0426* (2013.01); *G06F 3/005* (2013.01); *G06F 3/017* (2013.01); *G06F 3/0425* (2013.01);
(Continued)

(58) Field of Classification Search
CPC ......... G06F 3/0426; G06F 3/005; G06F 3/017
See application file for complete search history.

(56) References Cited

U.S. PATENT DOCUMENTS 7,226,173 B2    6/2007  Aoyanagi
7,348,963 B2    3/2008  Bell
(Continued)

FOREIGN PATENT DOCUMENTS

CN       103608754 A    2/2014
KR    1020120072502 A    7/2012
(Continued)

OTHER PUBLICATIONS

Licsar, A. et al.; "Hand Gesture Recognition in Camera-projector System"; published: Mar. 10, 2004; http://www.sztaki.hu/~sziranyi/Papers/HC104_licsar.pdf.
(Continued)

*Primary Examiner* — Ricardo L Osorio
(74) *Attorney, Agent, or Firm* — HP Inc. Patent Department

(57) ABSTRACT

Examples disclosed herein describe, among other things, a computing system. The computing system may in some examples include a touch-sensitive surface, a display, and at least one camera to capture an image representing an object disposed between the camera and the touch-sensitive surface. The computing system may also include a detection engine to determine, based at least on the image, display coordinates, where the display coordinates may correspond to the object's projection onto the touch-sensitive surface, and the display is not parallel to the touch-sensitive surface. In some examples, the detection engine is also to display an object indicator at the determined display coordinates on the display.

13 Claims, 7 Drawing Sheets

(52) U.S. Cl.
CPC ............. *G06F 2200/1631* (2013.01); *G06F 2203/04104* (2013.01); *G06F 2203/04106* (2013.01)

(56) References Cited

U.S. PATENT DOCUMENTS

| | | | |
|---|---|---|---|
| 7,599,561 B2 | 10/2009 | Wilson et al. | |
| 7,710,391 B2 | 5/2010 | Bell et al. | |
| 8,103,109 B2 | 1/2012 | Winn et al. | |
| 8,121,640 B2 | 2/2012 | Russ et al. | |
| 8,199,117 B2 | 6/2012 | Izadi et al. | |
| 8,619,049 B2 | 12/2013 | Harrison et al. | |
| 8,736,583 B2 | 5/2014 | Anderson et al. | |
| 8,773,514 B2 | 7/2014 | Gharib et al. | |
| 8,836,768 B1* | 9/2014 | Rafii ................. | G06F 3/017 345/420 |
| 8,854,433 B1* | 10/2014 | Rafii ................. | G06F 3/017 348/42 |
| 9,092,090 B2* | 7/2015 | Zhang ................ | G06F 3/042 |
| 9,160,993 B1* | 10/2015 | Lish ................. | H04N 5/23229 |
| 9,720,506 B2* | 8/2017 | Kim ................. | G06F 3/017 |
| 2005/0078092 A1 | 4/2005 | Clapper | |
| 2005/0162402 A1 | 7/2005 | Watanachote | |
| 2008/0018591 A1 | 1/2008 | Pittel et al. | |
| 2011/0043702 A1 | 2/2011 | Hawkins | |
| 2011/0063224 A1 | 3/2011 | Vexo et al. | |
| 2011/0242054 A1 | 10/2011 | Tsu | |
| 2012/0280950 A1 | 11/2012 | Stephanick et al. | |
| 2012/0299876 A1 | 11/2012 | De Leon et al. | |
| 2012/0306748 A1 | 12/2012 | Fleizach et al. | |
| 2013/0050145 A1 | 2/2013 | Robinson et al. | |
| 2013/0077236 A1 | 3/2013 | Becze et al. | |
| 2013/0127729 A1 | 5/2013 | Mosby et al. | |
| 2013/0257748 A1 | 10/2013 | Ambrus et al. | |
| 2013/0283213 A1 | 10/2013 | Guendelman et al. | |
| 2013/0343601 A1 | 12/2013 | Jia et al. | |
| 2014/0098224 A1 | 4/2014 | Zhang | |
| 2014/0201685 A1 | 7/2014 | Lim et al. | |
| 2014/0204120 A1 | 7/2014 | Moteki et al. | |
| 2014/0218477 A1 | 8/2014 | Pawelski | |
| 2014/0267029 A1 | 9/2014 | Govil et al. | |
| 2015/0131852 A1* | 5/2015 | Sweetser ............ | G01B 11/14 382/103 |
| 2015/0237319 A1* | 8/2015 | Tsai ................. | G03B 21/208 345/175 |
| 2016/0316186 A1* | 10/2016 | Krishnakumar ...... | G06F 3/044 |
| 2017/0192493 A1* | 7/2017 | Ofek ................ | G06F 3/005 |

FOREIGN PATENT DOCUMENTS

| | | |
|---|---|---|
| TW | 200512636 A | 4/2005 |
| WO | WO-2013054096 A1 | 4/2013 |
| WO | WO-2013108032 A1 | 7/2013 |

OTHER PUBLICATIONS

Shahram Izadi et al., "C-Slate: A Multi-Touch and Object Recognition System for Remote Collaboration using Horizontal Surfaces," 2007, pp. 3-10, IEEE.

Winkler et al., "Tangible Mixed Reality Desktop for Digital Media Management," Dec. 8, 2008, pp. 1-10, Available at: <stefan.winkler.net/Publications/spie6490.pdf>.

* cited by examiner

DISPLAYING AN OBJECT INDICATOR

BACKGROUND

Many computing systems today include a display, a camera, and an input device. In some systems, the display may be a touch-sensitive display, sometimes referred to as a touch screen. Input devices include, for example, a mouse, a keyboard, or a touch-sensitive surface capable of detecting physical objects that come into contact therewith.

BRIEF DESCRIPTION OF THE DRAWINGS

The following detailed description references the drawings, wherein.

DETAILED DESCRIPTION

Figure 1:
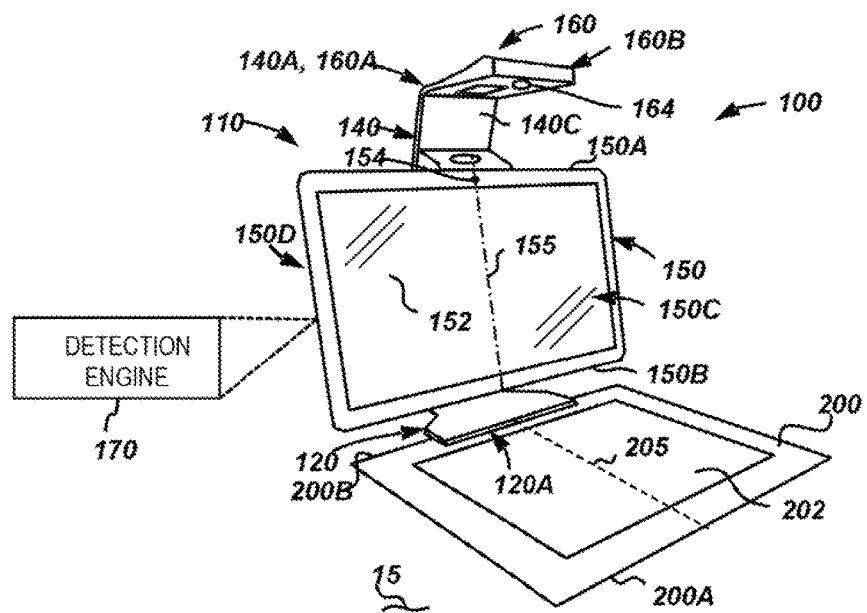
FIG. 1 is a schematic perspective view of an example computing system comprising an identification engine.

In some computing systems, user experience may be enhanced by allowing the user to use, in conjunction with an application running on the computing system, objects such as a stylus, a fingertip or fingertips, a game piece, and the like. The objects may be used as input devices, application (e.g., gaming) accessories, or for any other purposes. When using such objects, it may be difficult for the user to know whether and where the computing system has detected the object(s) if the user does not receive appropriate indication by the computing system.

In some examples described herein, a computing system is disclosed. The computing system may include, for example, a surface (e.g., a touch-sensitive surface), a display, and at least one camera to capture an image representing an object disposed, for example, between the camera and the surface. The system may also include a detection engine to determine, based at least on the image, display coordinates corresponding to the objects projection onto the touch-sensitive surface, where the display may not be parallel to the touch-sensitive surface. The system may also select an object indicator from at least two different object indicators based at least on whether the object is touching the touch-sensitive surface, and to provide the selected object indicator to the display for displaying the selected object indicator at the determined display coordinates on the display.

Referring now to the drawings, FIGS. 1-6 are schematic views of an example computing system 100 comprising a detection engine 170. In the examples of FIGS. 1-6, system 100 may include a support structure 110, a computing device 150, a display 152, and a touch-sensitive surface 200. System 100 may also include a sensor bundle 164 pointed, for example, at touch-sensitive surface, to capture one or more images representing an object disposed on or above touch sensitive surface 200. Computing device 150 may include a detection engine 170 to determine, based at least on one or more images (received, for example, from sensor bundle 164) display coordinates associated with coordinates of the objects projection onto touch-sensitive surface, and to display an object indicator at the determined display coordinates on the display.

Computing device 150 may comprise any suitable computing device complying with the principles disclosed herein. As used herein, a "computing device" may comprise an electronic display device, a smartphone, a tablet, a chip set, an all-in-one computer (e.g., a device comprising a display device that also houses processing resource(s) of the computer), a desktop computer, a notebook computer, workstation, server, any other processing device or equipment, or a combination thereof. In this example, device 150 is an all-in-one computer having a central axis or center line 155, first or top side 150A, a second or bottom side 150B axially opposite the top side 150A, a front side 150C extending axially between sides 150A and 150B, a rear side 150D also extending axially between sides 150A and 150B and generally radially opposite front side 150C. A display 152 is disposed along front side 150C and defines a viewing surface of computing system 100 to display images for viewing by a user of system 100. In examples described herein, a display may include components of any technology suitable for displaying images, video, or the like.

In some examples, display 152 may be a touch-sensitive display. In examples described herein, a touch-sensitive display may include, for example, any suitable technology (e.g., components) for displaying images, video, or the like, and may include any suitable technology (e.g., components) for detecting physical contact (e.g., touch input), such as, for example, a resistive, capacitive, surface acoustic wave, infrared (IR), strain gauge, optical imaging, acoustic pulse recognition, dispersive signal sensing, or in-cell system, or the like. In examples described herein, display 152 may be referred to as a touch-sensitive display 152. Device 150 may further include a camera 154, which may be a web camera, for example. In some examples, camera 154 may capture images of a user positioned in front of display 152. In some examples, device 150 may also include a microphone or other device to receive sound input (e.g., voice input from a user).

Figure 2:
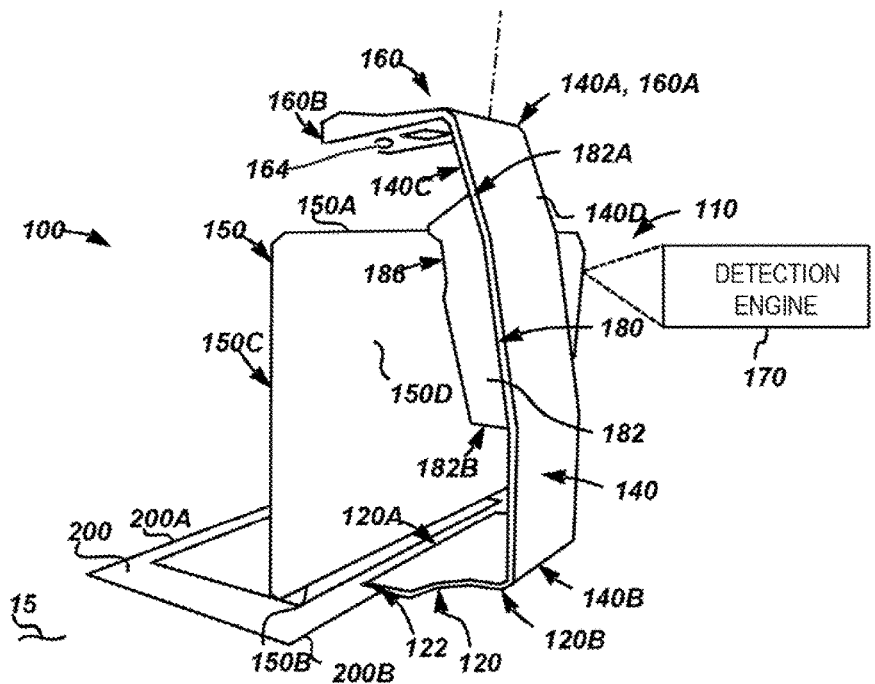
FIG. 2 is another schematic perspective view of the example computing system of FIG. 1.

In the example of FIGS. 1-6, support structure 110 includes a base 120, an upright member 140, and a top 160. Base 120 includes a first or front end 120A, and a second or rear end 120B. Base 120 may engage with a support surface 15 to support the weight of at least a portion of the components of system 100 (e.g., member 140, unit 180, device 150, top 160, etc.) In some examples, base 120 may engage with support surface 15 in this manner when system 100 is configured for operation. In the example of FIGS. 1-6, front end 120A of base 120 includes a raised portion 122 that may be disposed above and separated from support surface 15 (creating a space or clearance between portion 122 and surface 15) when base 120 is disposed on support surface 15 as illustrated in FIG. 2, for example. In such examples, a portion of a side of touch-sensitive surface 200 may be disposed in (e.g., received within) the space formed between portion 122 and surface 15. In such examples, placing a portion of surface 200 within the space created by portion 122 and surface 15 may assist with the proper alignment of surface 200. In other examples, other suitable methods or devices may be used to assist with the alignment of surface 200.

Upright member 140 includes a first or upper end 140A, a second or lower end 140E opposite the upper end 140A, a first or front side 140C extending between the ends 140A and 140B, and a second or rear side 140C opposite the front side 140C and also extending between the ends 140A and 140B. Lower end 140B of member 140 is coupled to rear end 120B of base 120, such that member 140 extends substantially upward from support surface 15.

Top 160 includes a first or proximate end 160A, a second or distal end 160B opposite the proximate end 160A, a top surface 160C extending between ends 160A and 160B, and a bottom surface 160D opposite the top surface 160C and also extending between ends 160A and 160B. Proximate end 160A of top 160 is coupled to upper end 140A of upright member 140 such that distal end 160B extends outward from upper end 140A of upright member 140. As such, in the example shown in FIG. 2, top 160 is supported at end 160A (and not at end 160B), and may be referred to herein as a cantilevered top. In some examples, base 120, member 140, and top 160 may be monolithically formed. In other examples, two or mores of base 120, member 140, and top 160 may be formed of separate pieces (i.e., not monolithically formed).

Touch-sensitive surface 200 may include a central axis or centerline 205, a first or front side 200A, and a second or rear side 200B axially opposite the front side 200A. Touch-sensitive surface 200 may comprise any suitable technology for detecting physical contact with surface 200 by an object such as hand or other objects (e.g., objects containing conductive material) whose placement on or close to surface 200 may cause a detectible change in capacitance or other parameters of surface 200. For example, touch-sensitive surface 200 may comprise any suitable technology for detecting (and in some examples tracking) one or multiple touch inputs by a user to enable the user to interact, via such touch input, with software being executed by device 150 or another computing device. As another example, touch-sensitive surface 200 may comprise any suitable technology for detecting (and in some examples tracking) one or multiple objects disposed on touch-sensitive surface 200 to enable the user to interact, via placement, rotation, movement, and other manipulations of such object(s), with software being executed by device 150 or another computing device.

In examples described herein, touch-sensitive surface 200 may be any suitable touch-sensitive planar (or substantially planar) object, such as a touch-sensitive mat, tabletop, sheet, etc. In some examples, touch-sensitive surface 200 may be disposed horizontally (or approximately or substantially horizontally). For example, surface 200 may be disposed on support surface 15, which may be horizontal (or approximately or substantially horizontal).

In some examples, all or substantially all of surface 200 may be capable of detecting touch input as described above. In other examples, less than all of surface 200 may be capable of detecting touch input as described above. For example, surface 200 may comprise a touch-sensitive region 202, extending over less than all of surface 200, wherein region 202 is capable of detecting touch input as described above. In other examples, region 202 may extend over substantially all of surface 200 (e.g., may be substantially coterminous with surface 200). Region 202 may be substantially aligned with axis 205.

As described above, surface 200 may be aligned with base 120 of structure 110 to assist with proper alignment of surface 200 (e.g., at least during operation of system 100). In the example of FIGS. 1-6, rear side 200B of surface 200 may be disposed between raised portion 122 of base 120 and support surface 15, such that rear end 200B is aligned with front side 120A of base 120 to assist with proper overall alignment of surface 200 (and particularly proper alignment of region 202) with other components of system 100. In some examples, surface 200 may be aligned with device 150 such that the center line 155 of device 150 is substantially aligned with center line 205 of surface 200. In other examples, surface 200 may be differently aligned with device 150.

In some examples, surface 200 and device 150 may be communicatively connected (e.g., electrically coupled) to one another such that user inputs received by surface 200 may be communicated to device 150. Surface 200 and device 150 may communicate with one another via any suitable wired or wireless communication technology or mechanism, such as, for example, WI-FI, BLUETOOTH, ultrasonic technology, electrical cables, electrical leads, electrical conductors, electrical spring-loaded pogo pins with magnetic holding force, or the like, or a combination thereof. In the example of FIGS. 1-6, exposed electrical contacts disposed on rear side 200B of surface 200 may engage with corresponding electrical pogo-pin leads within portion 122 of base 120 to communicate information (e.g., transfer signals) between device 150 and surface 200 during operation of system 100. In such examples, the electrical contacts may be held together by adjacent magnets (located in the clearance between portion 122 of base 120 and surface 15) to magnetically attract and hold (e.g., mechanically) a corresponding ferrous and/or magnetic material disposed along rear side 200B of surface 200.

Figure 3:
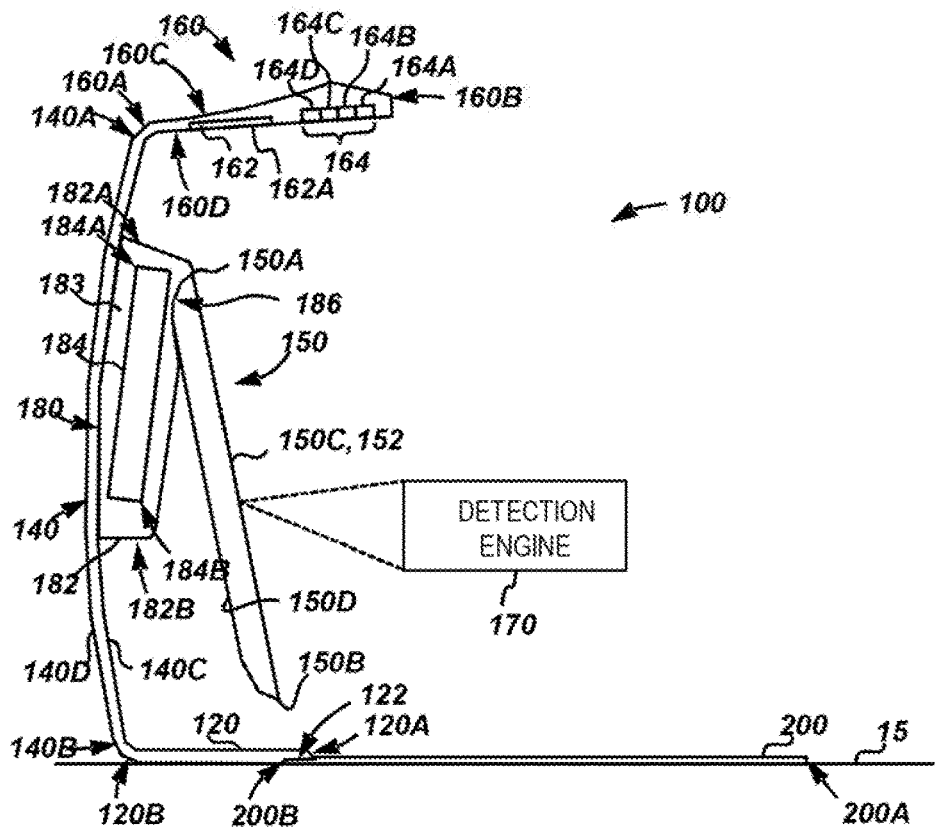
FIG. 3 is a schematic side view of the example computing system of FIG. 1.

Referring to FIG. 3, projector unit 180 comprises an outer housing 182, and a projector assembly 184 disposed within housing 182. Housing 182 includes a first or upper end 182A, a second or lower end 182B opposite the upper end 182A, and an inner cavity 183. In the example of FIG. 3, housing 182 further includes a coupling or mounting member 186 to engage with and support device 150 (e.g., at least during operation of system 100). Member 186 may be any suitable mechanism or device for suspending and supporting any suitable computing device 150 as described herein. For example, member 186 may comprise a hinge that includes an axis of rotation such that device 150 may be rotated (e.g., by a user) about the axis of rotation to attain a desired angle for viewing display 152. In some examples, device 150 may permanently or semi-permanently attached to housing 182 of unit 180. In some examples, housing 180 and device 150 may be integrally or monolithically formed as a single unit.

Figure 4:
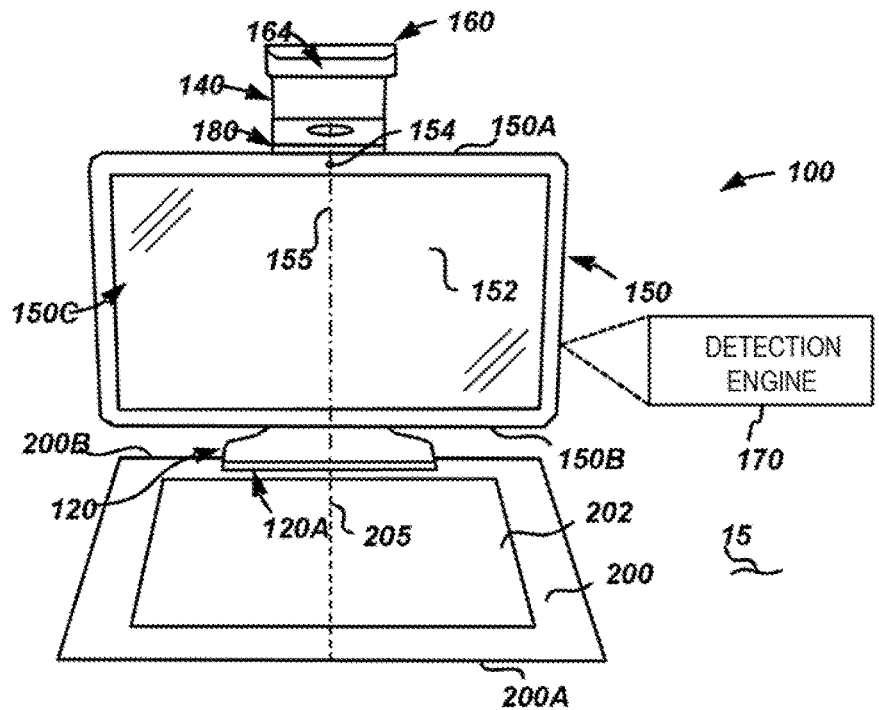
FIG. 4 is a schematic front view of the example computing system of FIG. 1.

Referring to FIG. 4, in some examples, when device 150 is suspended from structure 110 via mounting member 186 on housing 182, projector unit 180 (i.e., both housing 182 and assembly 184) may be substantially hidden behind device 150 when system 100 is viewed from the front (i.e., substantially facing display 152 disposed on front side 150C of device 150). In addition, as shown in FIG. 4, when device 150 is suspended from structure 110 as described above, projector unit 180 (i.e., both housing 182 and assembly 184) and any image projected thereby may be substantially aligned or centered with respect to center line 155 of device 150.

Referring again to FIG. 3, projector assembly 184 is disposed within cavity 183 of housing 182, and includes a first or upper end 184A, a second or lower end 184B opposite the upper end 184A. Upper end 184A is proximate upper end 182A of housing 182 while lower end 184B is proximate lower end 182B of housing 182. Projector assembly 184 may comprise any suitable digital light projector assembly for receiving data from a computing device (e.g., device 150) and projecting image(s) (e.g., out of upper end 184A) that correspond with that input data. For example, in some implementations, projector assembly 184 may comprise a digital light processing (DLP) projector or a liquid crystal on silicon (LCoS) projector which are advantageously compact and power efficient projection engines, capable of multiple display resolutions, and sizes, such as, for example, standard XGA resolution (1024×768 pixels) with a 4:3 aspect ratio, or standard WXGA resolution (1280×800 pixels) with a 16:10 aspect ratio. Projector assembly 184 is further communicatively connected (e.g., electrically coupled) to device 150 in order to receive data therefrom and to produce (e.g., project) light and image(s) from end 184A based on the received data. Projector assembly 184 may be communicatively connected to device 150 via any suitable type of electrical coupling, for example, or any other suitable communication technology or mechanism described herein. In some examples, assembly 184 may be communicatively connected to device 150 via electrical conductor(s), WI-FI, BLUETOOTH, an optical connection, ultrasonic connection, or a combination thereof. In the example of FIGS. 1-6, device 150 is communicatively connected to assembly 184 through electrical leads or conductors (e.g., as described above in relation to surface 200 and base 120) disposed within mounting member 186 such that, when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162A that is disposed along bottom surface 160D of top 160 and is positioned to reflect light, image(s), etc., projected from upper end 184A of projector assembly 184 toward surface 200 during operation. Mirror 162 may comprise any suitable type of mirror or reflective surface. In the example of FIGS. 1-6, fold mirror 162 may comprise a standard front surface vacuum metalized aluminum coated glass mirror that acts to fold light emitted from assembly 184 down to surface 200. In other examples, mirror 162 may have a complex aspherical curvature to act as a reflective lens element to provide additional focusing power or optical correction.

Sensor bundle 164 includes at least one sensor (e.g., camera, or other type of sensor) to detect, measure, or otherwise acquire data based on the state of (e.g., activities occurring in) a region between sensor bundle 164 and surface 200. The state of the region between sensor bundle 164 and surface 200 may include object(s) disposed on or above surface 200, or activities occurring on or near surface 200. In the example of FIG. 3, bundle 164 includes an RGB camera (or image sensor) 164A, an IR camera (or IR sensor) 164B, a depth camera (or depth sensor) 164C, and an ambient light sensor 164D. In examples described herein, a camera may be referred to as a "sensor".

In some examples, RGB camera 164A may be a camera to capture color images (e.g., at least one of still images and video). In some examples, RGB camera 164A may be a camera to capture images according to the RGB color model, which may be referred to herein as "RGB images". It is appreciated, however, that in other examples, RGB camera 164A may be a camera to capture image according to other color models, such as YUV, YCbCr, RAW, and so forth. In some examples, RGB camera 164A may capture images with relatively high resolution, such as a resolution on the order of multiple megapixels (MPs), for example. As an example, RGB camera 164A may capture color (e.g., RGB) images with a resolution of 14 MPs. In other examples, RBG camera 164A may capture images with a different resolution. In some examples, RGB camera 164A may be pointed toward surface 200 and may capture image(s) of surface 200, object(s) disposed between surface 200 and RGB camera 164A (e.g., hovering above surface 200 or touching surface 200), or a combination thereof.

IR camera 164B may be a camera to detect intensity of IR light at a plurality of points in the field of view of the camera 164B. In examples described herein, IR camera 164B may operate in conjunction with an IR light projector 166 of system 100 to capture IR images. In such examples, each IR image may comprise a plurality of pixels each representing an intensity of IR light detected at a point represented by the pixel. In some examples, top 160 of system 100 may include an IR light projector 166 to project IR light 167 toward surface 200 and IR camera 164B may be pointed toward surface 200. In such examples, IR camera 164B may detect the intensity of IR light reflected by surface 200, object(s) disposed between surface 200 and IR camera 164B (e.g., hovering above surface 200 or touching surface 200), or a combination thereof. In some examples, IR camera 164B may exclusively detect IR light 167 projected by IR light projector 166 (e.g., as reflected from surface 200, object(s), etc., or received directly from an infrared source).

Depth camera 164C may be a camera (sensor(s), etc.) to detect the respective distance(s) (or depth(s)) of portions of object(s) in the field of view of depth camera 164C. As used herein, the data detected by a depth camera may be referred to herein as "distance" or "depth" data. In examples described herein, depth camera 164C may capture a multi-pixel depth image (e.g., a depth map), wherein the data of each pixel represents the distance or depth (measured from camera 164C) of a portion of an object at a point represented by the pixel. Depth camera 164C may be implemented using any suitable technology, such as stereovision camera(s), a single IR camera sensor with a uniform flood of IR light, a dual IR camera sensor with a uniform flood of IR light, structured light depth sensor technology, time-of-flight (TOF) depth sensor technology, or a combination thereof. In some examples, depth sensor 164C may indicate when an object (e.g., a three-dimensional object) is on surface 200. In some examples, depth sensor 164C may detect at least one of the presence, shape, contours, motion, and the respective distance(s) of an object (or portions thereof) placed on surface 200 or hovering above surface 200.

Ambient light sensor 164D may be arranged to measure the intensity of light in the environment surrounding system 100. In some examples, system 100 may use the measurements of sensor 164D to adjust other components of system 100, such as, for example, exposure settings of sensors or cameras of system 100 (e.g., cameras 164A-164C), the intensity of the light emitted from light sources of system 100 (e.g., projector assembly 184, display 152, etc.), or the like.

In some examples, sensor bundle 164 may omit at least one of sensors 164A-164D. In other examples, sensor bundle 164 may comprise other camera(s), sensor(s), or the like in addition to sensors 164A-164D, or in lieu of at least one of sensors 164A-164D. For example, sensor bundle 164 may include a user interface sensor comprising any suitable device(s) (e.g., sensor(s), camera(s)) for tracking a user input device such as, for example, a hand, stylus, pointing device, etc. In some examples, the user interface sensor may include a pair of cameras which are arranged to stereoscopically track the location of a user input device (e.g., a stylus) as it is moved by a user about the surface 200 (e.g., about region 202 of surface 200). In other examples, the user interface sensor may additionally or alternatively include IR camera(s) or sensor(s) arranged to detect infrared light that is either emitted or reflected by a user input device. In some examples, sensor bundle 164 may include a gesture camera to detect the performance of predefined gestures by object(s) (e.g., hands, etc.). In some examples, the gesture camera may comprise a depth camera and additional functionality to detect, track, etc., different types of motion over time.

In examples described herein, each of sensors 164A-164D of bundle 164 is communicatively connected (e.g., coupled) to device 150 such that data generated within bundle 164 (e.g., images captured by the cameras) may be provided to device 150, and device 150 may provide commands to the sensor(s) and camera(s) of sensor bundle 164. Sensors 164A-164D of bundle 164 may be communicatively connected to device 150 via any suitable wired or wireless communication technology or mechanism, examples of which are described above. In the example of FIGS. 1-6, electrical conductors may be routed from bundle 164, through top 160, upright member 140, and projector unit 180 and into device 150 through leads that are disposed within mounting member 186 (as described above).

Figure 5:
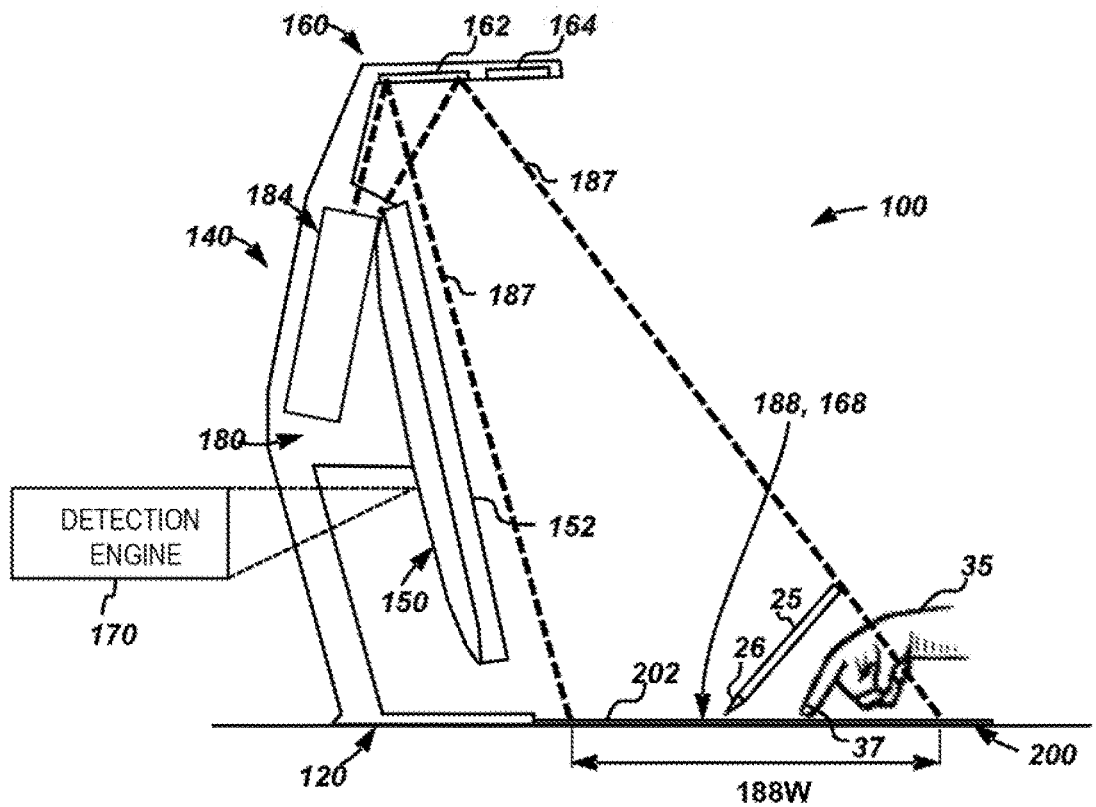
FIG. 5 is a schematic side view of the example computing system of FIG. 1 during an example operation.
Figure 6:
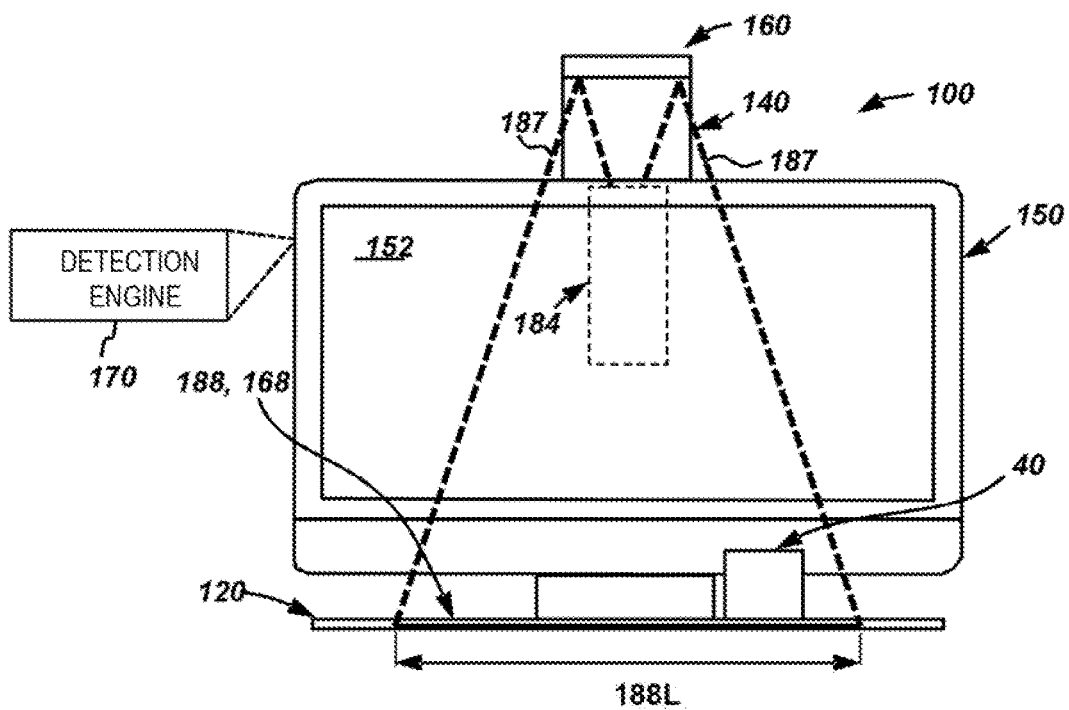
FIG. 6 is a schematic front view of the example computing system of FIG. 1 during another example operation.

Referring to FIGS. 5 and 6, during operation of system 100, projector assembly 184 may project visible light 187 to reflect off of mirror 162 towards surface 200 to thereby display visible image(s) on a projector display space 188 of surface 200. In the example of FIGS. 5 and 6, space 188 may be substantially rectangular, having a length 188L and a width 188W. In some examples, length 188L may be approximately 16 inches, while width 188W may be approximately 12 inches. In other examples, length 188L and width 188W may have different values.

Figure 7A:
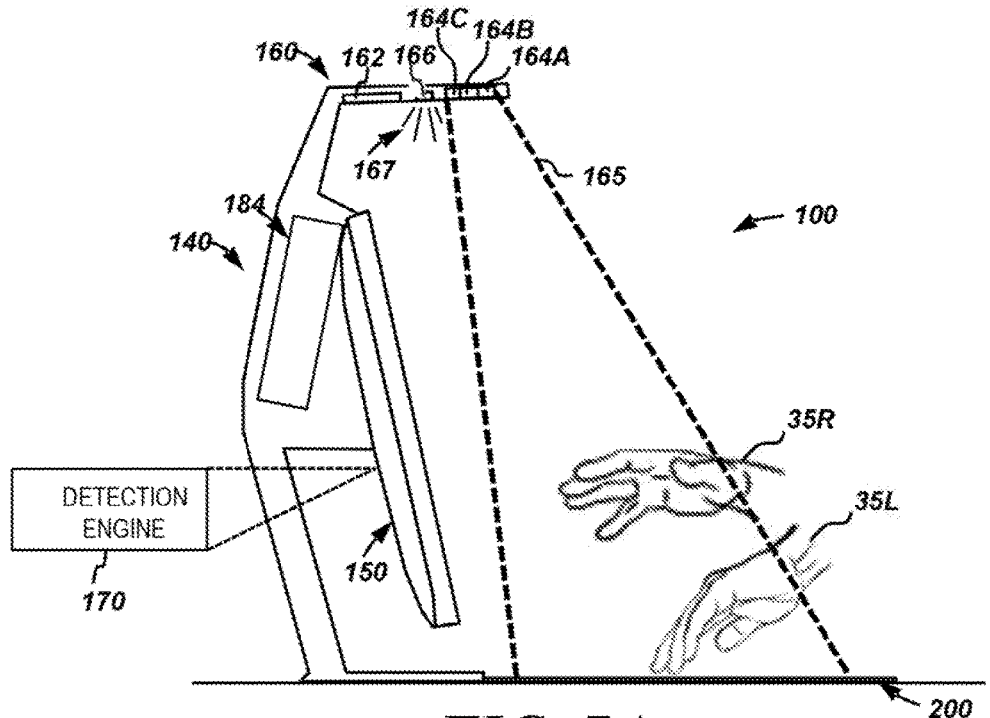
FIG. 7A is another side view of the example computing system of FIG. 1.

In some examples, cameras of sensor bundle 164 (e.g., cameras 164A-164C) are arranged within system 100 such that the field of view of each of the cameras includes a space 168 of surface 200 that may overlap with some or all of display space 188, or may be coterminous with display space 188. In examples described herein, the field of view of the cameras of sensor bundle 164 (e.g., cameras 164A-164C) may be said to include space 168, though at times surface 200 may be at least partially occluded by object(s) on or above surface 200 in such examples, the object(s) on or over surface 200 may be in the field of view of at least one of cameras 164A-164C. In such examples, sensors of sensor bundle 164 may acquire data based on the state of (e.g., activities occurring in, object(s) disposed in) a region between sensor bundle 164 and space 168 of surface 200. In some examples, both space 188 and space 168 coincide or correspond with region 202 of surface 200 such that functionalities of touch-sensitive region 202, projector assembly 184, and sensor bundle 164 are all performed in relation to the same defined area. A field of view 165 of the cameras of sensor bundle 164 (e.g., cameras 164A-164C) is schematically illustrated in FIG. 7A. In some examples, each of the cameras of sensor bundle 164 (e.g., cameras 164A-164C) may have a different field of view.

Referring now to FIGS. 5 and 6, device 150 may direct projector assembly 184 to project image(s) onto surface 200 (e.g., onto region 202). Device 150 may also display image(s) on display 152 (which may be the same as or different than the image(s) projected onto region 202 by projector assembly 184). The image(s) projected by assembly 184 may comprise information and/or images produced by software being executed by device 150. In some examples, a user may interact, with the image(s) projected on surface 200 and displayed on display 152 by physically engaging touch-sensitive surface 200 in any suitable manner, such as with user's hand 35 (e.g., via, touches, taps, gestures, or other touch input), with a stylus 25, or via any other suitable user input device(s) As described above, touch-sensitive surface 200 may detect such interaction via physical engagement with surface 200. Also, in some examples, projector assembly 184 may also project image(s) (at least partially) on objects disposed over surface 200 (e.g., hand 35, as shown in FIG. 5).

As an example, when a user interacts with touch-sensitive surface 200 via physical contact, surface 200 may generate touch input information and provide it to device 150 through any suitable connection (examples of which are described above). In some examples, the OS may pass the received touch input to another application (e.g., program, etc.) executing on device 150. In response, the executing OS or application may alter image(s) projected by projector assembly 184, image(s) displayed on display 152, or a combination thereof. As used herein, an "application", "computer application", or "service" may be a collection of machine-readable instructions that are executable by a processing resource. In some examples, a user may similarly interact with image(s) displayed on display 152 (which may be a touch-sensitive display), or any other input device of device 150 (e.g., a keyboard, mouse, etc.).

In some examples, sensors (e.g., cameras) of sensor bundle 164 may also generate system input which may be provided to device 150 for further processing. For example, system 100 may utilize camera(s) of bundle 164 to detect at least one of the presence and location of an object (e.g., user's hand 35, fingertip 37, stylus 25, etc.), and provide system input information representing the detected information to device 150. In some examples, system 100 may utilize one or more cameras to determine a three-dimensional location of an object, and provide that location information to device 150. In some examples, system 100 may use at least two images obtained from at least two different cameras of bundle 164 (e.g., any combination of two cameras from cameras 164A, 164B, and 164C) to determine the three-dimensional location of the object. For example, at least two cameras of sensor bundle 164 may arranged to perform stereoscopic object tracking of the object. In some examples, an object (e.g., stylus 25) may include at least one portion (e.g., a tip 26) coated with an infrared retro-reflective coating (e.g., paint) that may serve as an infrared retro-reflector. In such examples, bundle 164 may include IR camera(s) (or sensor(s)), as described above, which may detect IR light that is reflected off the coated portion to enable device 150 to track the location of the coated portion of the object as it moves across region 202. In some examples, surface 200 (with image(s) projected on it by assembly 184) may serve as a second or alternative touch-sensitive display within system 100. In addition, detection of interaction with image(s) displayed on surface 200 may be enhanced through use of sensors of sensor bundle 164 as described above.

In some examples, system 100 may capture two-dimensional (2D) image(s) or create a three-dimensional (3D) scan of a physical object such that an image of the object may then be projected onto surface 200 for further use and manipulation thereof. For example, as shown in FIG. 6, an object 40 may be placed on surface 200 such that sensors of bundle 164 (e.g., at least one of cameras 164A-164C) may detect at least one of the location, dimensions, and color of object 40, to enhance the 2D image(s) or create the 3D scan thereof. In such examples, the information gathered by the sensors of bundle 164 may be provided to device 150 (e.g., an OS, application, service, etc., of device 150), as described above. In some examples, after receiving the information, device 150 (e.g., the OS, application, service, etc.) may direct projector assembly 184 to project an image of object 40 onto surface 200. Object 40 may be, for example, hand 35, fingertip 37, stylus 25, or any other physical object, such as a game piece, a book, a mug, a pen, a document, a photo, and the like.

Figure 7B:
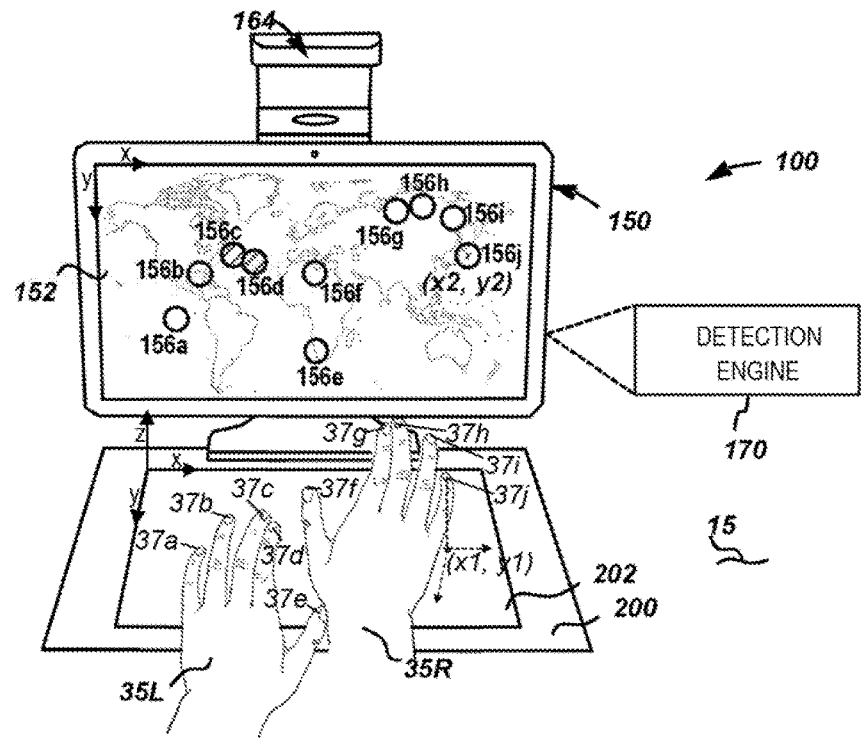
FIG. 7B is a perspective view of the example computing system of FIG. 7A.

FIGS. 7A and 7B illustrate a side view and a perspective view, respectively, of an example computing system 100 comprising detection engine 170. In the example of FIGS. 7A and 7B, the user may use fingertips 37a-37e of a left hand 35L and fingertips 37f-37j as objects that may be detected and processed by detection engine 170 as further described in detail below.

Figure 8:
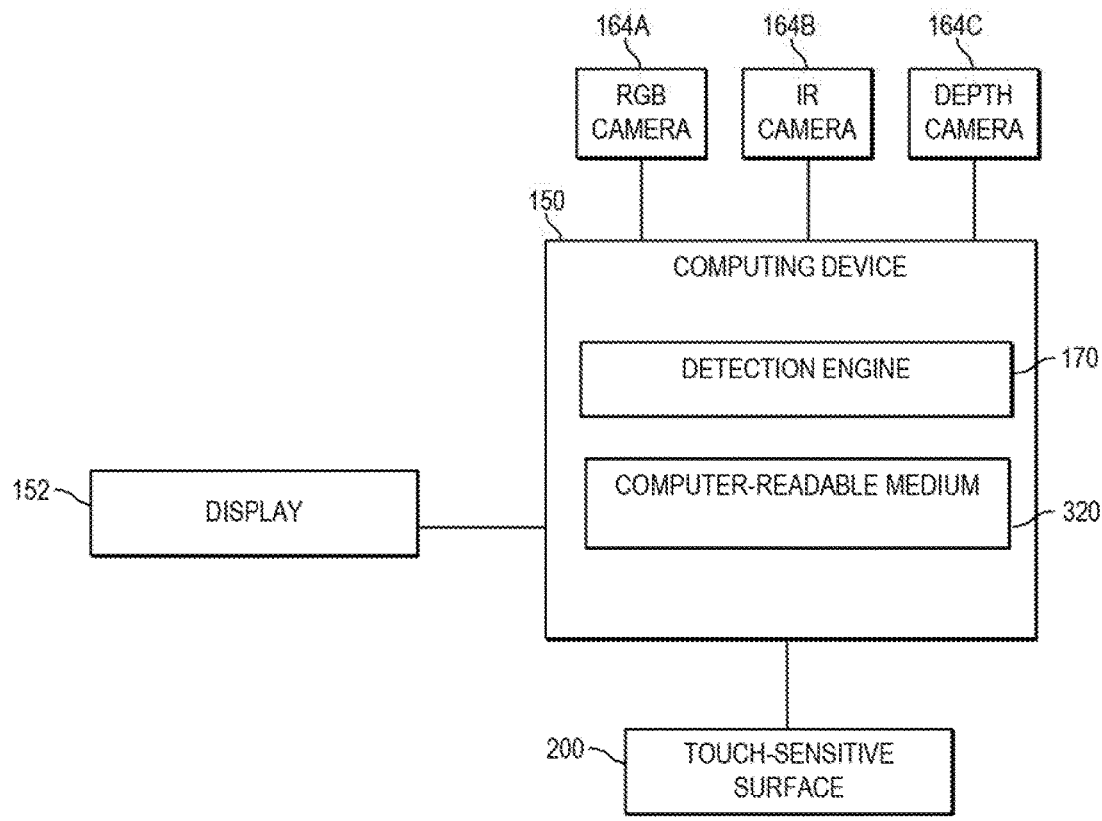
FIG. 8 is a block diagram of an example computing device of the example computing system of FIG. 1.

FIG. 8 is a block diagram of an example portion of computing system 100 of FIG. 1 comprising detection engine 170. In particular, FIG. 8 illustrates an example of computing device 150 that comprises detection engine 170 and a computer-readable medium 320, and is communicatively connected to at least one camera (e.g., camera 164A) of sensor bundle 164 (as described above), to touch-sensitive surface 200, and to display 152, as described above. Although not shown in FIG. 8 computing device 150 may also be communicatively connected to other components of system 100 as described above.

Computing device 150 (or any other computing device implementing detection engine 170) may include at least one processing resource. In examples described herein, a processing resource may include, for example, one processor or multiple processors included in a single computing device or distributed across multiple computing devices. As used herein, a "processor" may be, at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

As noted above, computing device 150 may comprise detection engine 170. In some examples, not shown herein, computing device 150 may include additional engines, and detection engine 170 may comprise a number of sub-engines. In examples described herein, any engine(s) of computing device 150 (e.g., engine 170) may be any combination of hardware and programming to implement the functionalities of the respective engine. Such combinations of hardware and programming may be implemented in a number of different ways. For example, the programming may be processor executable instructions stored on a non-transitory machine-readable storage medium (e.g., computer-readable medium 320) and the hardware may include a processing resource to execute those instructions. In such examples, the machine-readable storage medium may store instructions that, when executed by the processing resource, implement the engines. The machine-readable storage medium storing the instructions may be integrated in the same computing device (e.g., device 150) as the processing resource to execute the instructions, or the machine-readable storage medium may be separate from but accessible to the computing device and the processing resource. The processing resource may comprise one processor or multiple processors included in a single computing device or distributed across multiple computing devices.

In some examples, the instructions can be part of an installation package that, when installed, can be executed by the processing resource to implement the engines of system 100. In such examples, the machine-readable storage medium may be a portable medium, such as a compact disc, DVD, or flash drive, or a memory maintained by a server from which the installation package can be downloaded and installed. In other examples, the instructions may be part of an application or applications already installed on a computing device including the processing resource (e.g., device 150). In such examples, the machine-readable storage medium may include memory such as a hard drive, solid state drive, or the like.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory (RAM), any type of storage disc (e.g., a compact disc, a DVD, etc.), and the like, or a combination thereof. Further, any machine-readable storage medium described herein may be non-transitory.

Referring to FIG. 8 in conjunction with FIGS. 7A and 7B, detection engine 170 may obtain one or more images representing an object (e.g., one or more RGB images representing the object, one or more infrared images representing the object, and/or one or more depth images representing the object) from one or more cameras of sensor bundle 164. In some examples, engine 170 may obtain at least two images representing the object, and in some examples, the two images may be obtained from two different cameras of sensor bundle 164. In some example, the two cameras may be any two cameras of sensor bundle 164.

Based on the obtained image(s), engine 170 may determine a three-dimensional dimensional location (e.g., coordinates) of the object (e.g., of one or more, fingers 37a-37j illustrated in FIGS. 7A and 7B). The three-dimensional coordinates may be expressed, for example, in Cartesian coordinates (x, y, z), having a point of origin, for example, at the far-left corner of sensitive region 202, from a user's perspective. In some examples, the "z" axis may be perpendicular to surface 200 and the "y" axis may be parallel to centerline 205. In other examples, other coordinate systems and orientations may be used to define the three-dimensional coordinates of the object(s).

Based on the obtained three-dimensional coordinates of an object, engine 170 may determine two-dimensional coordinates of the object's projection onto touch-sensitive surface 200. In some examples, the object's projection may be a parallel projection, where the object's three-dimensional coordinates are projected onto a point on surface 200 via a line perpendicular to surface 200. For example, if the three-dimensional coordinates of fingertip 37j are (x1, y1, z1), its two-dimensional projection coordinates may be (x1, y1), as illustrated in FIG. 7B, in other examples, the object's projection may be a perspective projection, where the object's three-dimensional coordinates may be projected onto a point on surface 200 via a line that is not necessarily perpendicular to surface 200, such as a line connecting the object with a predefined point, e.g., some point on sensor bundle 164 or projector assembly 184. Irrespective to what type of projection is chosen, engine 170 may obtain the two-dimensional coordinates of the object projection onto surface 200 based on the object's three-dimensional coordinates and the location and orientation of surface 200.

In some examples, engine 170 may obtain the two-dimensional projection coordinates directly from the one or more images obtained from one or more cameras of sensor bundle 164, without first obtaining the three-dimensional coordinates of the object. For example, engine 170 may use one or more pre-calibrated transformation matrices to transform an object's (two-dimensional) coordinates within the obtained image(s) into two-dimensional projection coordinates.

In some examples, based on the determined two-dimensional projection coordinates, engine 170 may determine two-dimensional display coordinates on display 152. The display coordinates may be associated with (or correspond to) the projection coordinates in various ways. In some examples, display coordinates may be a linear or a non-linear function of the projection coordinates. For example, engine 170 may use one or more linear transformation matrices to transform the projection coordinates into the display coordinates. In some examples, the coordinates are transformed such that point (0,0) in projection coordinates (e.g., the far-left corner of region 202) is transformed into point (0,0) in display coordinates (e.g., top-left corner of display 152), Similarly, engine 170 may scale the coordinate of projection coordinates by a ratio between the width of display 152 and the width of region 202, and scale the "y" coordinate of the projection coordinates by a ratio between the height of display 152 and the height of region 202. As a result, the near-right corner of region 202 may be transformed into the bottom-right corner of display 152.

After determining the display coordinates, engine 170 may display an object indicator at the display coordinates on display 152. As used herein, "displaying an object indicator" may refer, for example, to providing the object indicator to display 152 for displaying the object indicator, causing display 152 to display the object indicator. For example, as illustrated in FIG. 7B, engine 170 may determine projected coordinates of fingertips 37a-37j onto surface 200, as described above. Based on the projected coordinates, engine 170 may calculate display coordinates, and display object indicators 156a-156j at or near the respective calculated display coordinates. For example, for fingertip 37j, engine 170 may determine projected coordinates (x1, y1). Based on these projected coordinates, engine 170 may calculate display coordinates (x2, y2), and display object indicator 156j at these coordinates, as depicted in FIG. 7B.

The displayed object indicators may include any types of shapes, icons, graphics, etc., and may have different colors and different levels of transparency or opacity. In some examples, all object indicators displayed on display 152 may have the same appearance, while in other examples, two simultaneously displayed indicators corresponding to two different objects may be different (e.g., have a different appearance). In some examples, engine 170 may detect the object's type (e.g., a fingertip, a stylus, etc.) and select one of a plurality of (e.g., at least two) different object indicators based on the object's type. Engine 170 may further distinguish between objects of the same type. For example, engine 170 may detect, for each fingertip, to which finger on which hand that fingertip corresponds, and select different object indicators for different, fingers and hands.

In some examples, the one or more object indicators displayed on display 152 may be combined with (e.g., overlaid upon) another image displayed on display 152. The other image may be provided to display 152 by an operating system or an application being executed computing device 150. Accordingly, the user may use objects, such as fingertips, to identify and select target areas of an image displayed on display 152, and the object indicators can serve as visual guides or cursors indicating the locations on display 152 corresponding to the objects' projection onto surface 200.

As described above, in some examples, the objects (e.g., fingertips 37) may be disposed anywhere in the region between sensor bundle 164 and surface 200. Accordingly, the objects may be touching surface 200, hovering above surface 200, etc. In some examples, engine 170 may determine (e.g., based on signals from surface 200) whether a particular object is touching surface 200, and select a different object indicator from a plurality of indicators (or modify the appearance of the same object indicator) based on the determination. For example, touch-sensitive surface 200 may detect one or more touches by objects, and pass touch data describing the one or more touches to engine 170.

Based on the touch data received from surface 200, engine 170 may determine, for each touch included in the touch data, whether the touch is associated with one of the objects (e.g., fingertips) detected, as described above, based on image(s) from sensor bundle 164. For example, engine 170 may determine whether the location of a particular touch on surface 200 coincides or is within a predefined distance (e.g., 1 mm) from the one of the objects or from one of the objects' projections onto surface 200. For example, engine 170 may determine whether the location of a particular touch is directly or substantially underneath of a particular object, which may be determined, for example, based on the touch data and the one or more images from camera(s) of sensor bundle 164 (or the object's three-dimensional coordinates determined based on the images). In some examples, engine 170 may determine whether a particular touch is associated with a particular object by determining the object's distance from surface 200, for example, using depth data received from depth camera 164c, or using the throe-dimensional coordinates determined as described above. For example, if only one of a plurality of objects is touching surface 200, engine 170 may determine which object is touching surface 200 by determining the object with the minimal distance or with a distance below a predefined distance (e.g., 1 mm).

In the example as illustrated in FIGS. 7A and 7B, fingertips 37c and 37d are touching surface 200 while other fingertips are hovering above surface 200. In this example, engine 170 may detect two touches based on touch data provided by surface 200 and determine (e.g., based on the image(s) of fingertips 37a-37j or the three-dimensional locations of fingertips 37a-37j determined based on the images) that the two touches correspond to fingertips 37c and 37d. Accordingly, as illustrated in FIG. 7B, engine 170 may select object indicators 156c and 156d from a first type (e.g., a highlighted circle) and select object indicators 156a, 156b, and 156e-156j from a second (different) type (e.g., a non-highlighted circle). This may provide the user with a confirmation that one or more touches have been detected, and also provide the user with a visual guidance as to which of the object indicators displayed on display 152 correspond to touching objects and which correspond to non-touching (hovering) objects. This may allow the user to focus attention, for example, only on the objects that are touching surface 200. In some examples, engine 170 may be configured (e.g., by the user) to display object indicators only of objects that are touching surface 200, only of objects that are not touching surface 200, or of both types of objects.

In some examples, engine 170 may determine whether or not to display an object indicator of an object based on the object's location. For example, display 152 may be a touch-sensitive display, in which case the user may sometimes choose to provide user input by using (e.g., touching) display 152, rather than using the object detection functionality described above. In such examples, engine 170 may determine that the object (e.g., the fingertip) moves closer to display 152 and farther from surface 200, and based on that determination stop displaying the object indicator for that object or for all objects. Similarly, engine 170 may determine that the object moves farther from display 152 and closer to surface 200, and based on that determination, start displaying the object indicator for that object.

In particular, in some examples engine 170 may determine whether or not to display an object indicator of an object based on the object's distance from surface 200, based on the object's distance from display 152, or based on both distances. For example, engine 170 may display an object indicator of an object if the object is within a predefined distance (e.g., 150 mm) from surface 200, and not display (or stop displaying) the object indicator if the object is not within (or moves outside of) the predefined distance from surface 200. As another examples, engine 170 may display an object indicator of an object if the object is within a predefined distance of display 152, and, not display (or stop displaying) the object indicator if the object is not within (or moves outside of) the predefined distance from display 152. In some examples, engine 170 may display an object indicator of an object if the object's distance from surface 200 is smaller than the object's distance from display 152 and not display the object indicator otherwise.

In some examples, engine 170 may determine whether or not to display an object indicator of an object based on a ratio or difference between the object's distance from surface 200 and the object's distance from display 152. For example, engine 170 may display an object indicator of an object if the ratio or difference is smaller than a predefined ratio or predefined difference and not display (or stop displaying) the object indicator if the ratio or difference is greater or equal to the predefined ratio or predefined difference. In some examples, engine 170 may determine whether or not to display an object indicator of an object based on a distance between the object and sensor bundle 164, as determined, for example, based on input from ambient light sensor 164D or other camera(s) in sensor bundle 164. For example, engine 170 may display an object indicator of an object if the distance is smaller than a predefined distance, and not display (or stop displaying) the object indicator if the distance is greater or equal to the predefined distance.

In some examples, engine 170 may implement a hysteresis mechanism and adjust the predefined distances, ratios, differences, and other thresholds discussed above when the object crosses the threshold. This may prevent jittering (rapid displaying and hiding of the object indicator) when the object is located near the threshold, and is unintentionally crossing it back and forth. In some examples, the various thresholds described above may be predefined and fixed, or configurable by the user. In some examples, the object's distances from display 152 and surface 200 may be determined by engine 170, for example, based on the three-dimensional coordinates of the object, as described above, or using other suitable methods, such as using depth data received from depth camera 164c or other cameras of sensor bundle 164, in some examples, engine 170 may determine for each object whether to display an object indicator for that object. Thus, in some examples, engine 170 may simultaneously display object indicators for one or more detected objects, and not display object indicators for other detected object(s). In other examples, engine 170 may not display object indicators for any detected object if engine 170 determines that at least one object indicator should not be displayed, using any of the techniques described above.

While in some of the above examples engine 170 is described as being configured to determine the object's location and to display a corresponding object indicator only once, it is appreciated that engine 170 may be configured to perform the described functionality continuously, for example, a fixed number of times (e.g., 30) per second. Thus, in some examples, as the one or more objects are moving and as some objects are touching or stopping touching surface 200, engine 170 may continuously and in real time detect new object locations and touches, and update the displayed object indicators accordingly.

Figure 9:
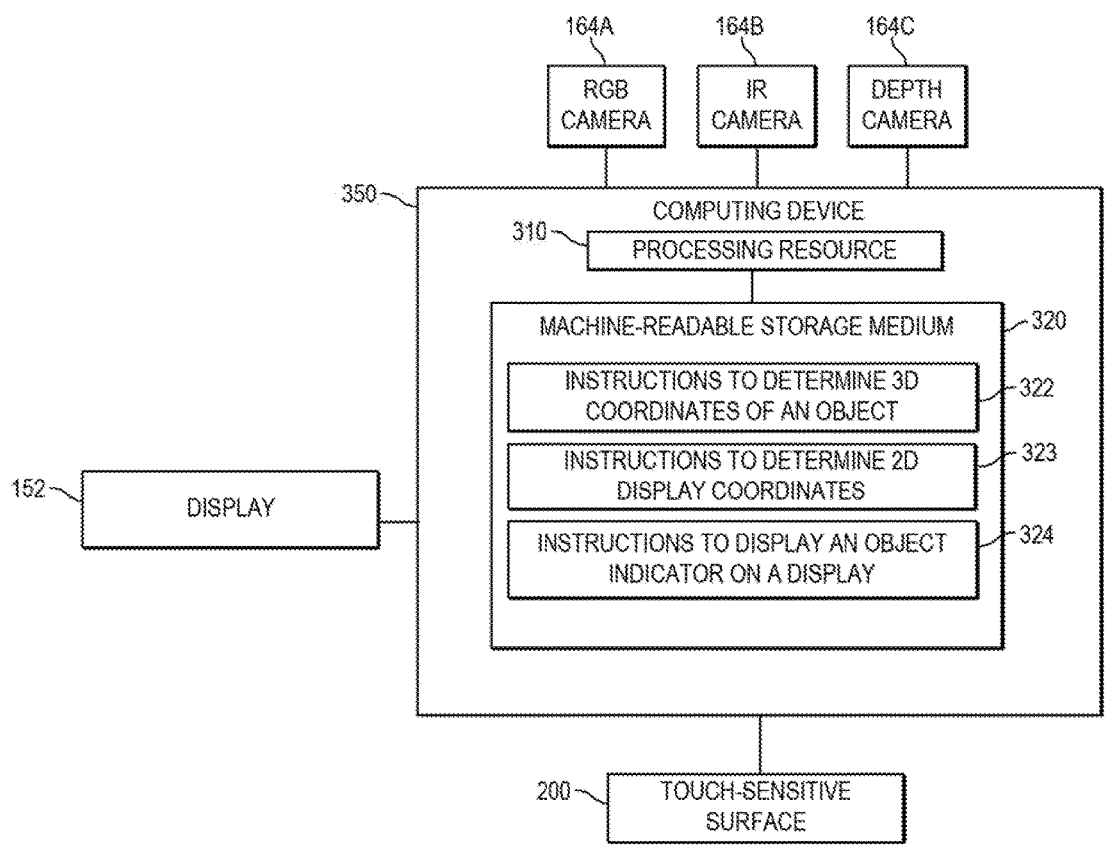
FIG. 9 is a block diagram of another example computing device of the example computing system of FIG. 1.

FIG. 9 is a block diagram of an example portion of computing device 150. In the example of FIG. 9, computing device 150 is communicatively connected to touch-sensitive surface 200, cameras 164A-164C, and display 152, as described above. Each of cameras 164A-164C may be disposed above and pointed at surface 200. Computing device 150 may further include a processing resource 310 and a machine-readable storage medium 320 comprising (e.g., encoded with) instructions 322-324.

In some examples, storage medium 320 may include additional instructions. In some examples, instructions 322-324 and any other instructions described herein in relation to storage medium 320 may be stored on a machine-readable storage medium remote from but accessible to computing device 150 and processing resource 310. Processing resource 310 may fetch, decode, and execute instructions stored on storage medium 320 to implement the functionalities described herein. In other examples, the functionalities of any of the instructions of storage medium 320 may be implemented in the form of electronic circuitry, in the form of executable instructions encoded on a machine-readable storage medium, or a combination thereof. Machine-readable storage medium 320 may be a non-transitory machine-readable storage medium.

In some examples, instructions 322 may determine three-dimensional coordinates of an object, for example, based on at least two images obtained from two different cameras of sensor bundle 164, as described above. In some examples, as described above, the object may be disposed on or above a surface (e.g., hovering above or touching the surface), where the surface may be any surface other than the surface of a display, e.g., any surface that is not parallel to the surface of the display, such as touch-sensitive surface 200. Based on the three-dimensional object coordinates, instructions 324 may determine two-dimensional display coordinates that may be associated with or correspond to two-dimensional projection coordinates corresponding to the object's projection onto the surface, as described above. Instructions 324 may display an object indicator at the determined display coordinates on the display.

As described above, in some examples the surface may be a touch-sensitive surface, and medium 320 may also include instructions to receive from the touch-sensitive surface touch data representing at least one touch: determine whether the touch is associated with the object, as described above; and select the object indicator from at least two different object indicators based on whether the touch is associated with the object. Medium 320 may also include instructions to detect the type of the object (e.g., a stylus, a fingertip, etc.) and select the object indicators based on the detected type, as described above. Further, medium 320 may include instructions to determine whether or not to display the object indicator based on the object's distance from the surface and the object's distance from the display (e.g., based on the ratio and/or the difference between the two distances).

In some examples, features and functionalities described herein in relation to FIG. 9 may be provided in combination with features and functionalities described herein in relation to any of FIGS. 1-8 and 10.

Figure 10:
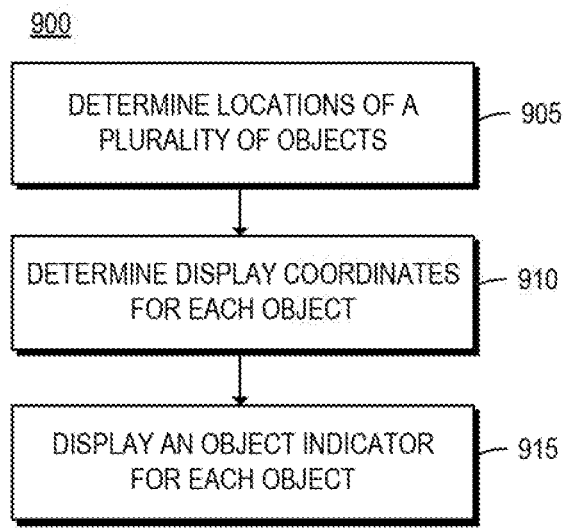
FIG. 10 is a flowchart of an example method for displaying at least one object indicator.

FIG. 10 is a flowchart of an example method 900 for displaying at least one object indicator. Method 900 may be performed, for example, by at least one computing system (e.g., computing system 100) having at least one computing device (e.g., computing device 150) having at least one processing resource (e.g., processing resource 310), or by any other combination of hardware and/or software processors, computing devices and/or computing systems.

At block 905, method 900 may determine locations (e.g., three-dimensional locations) of a plurality of objects, where at least one object may be touching a surface (e.g., touch-sensitive surface 200) and at least one other object may not be touching the surface. For example, as described above, the method may determine the locations based on an image or a plurality of images obtained from one or more cameras of sensor bundle 164. At block 910, method 900 may determine, based at least on the locations, display coordinates for the object or for each of the plurality of objects. As described above, the display coordinates of an object may correspond to (e.g., be a linear function of) the objects projection onto the surface. The surface may be any surface other that the surface of a display (e.g., display 152), such as touch-sensitive surface 200. At block 915, the method may display an object indicator for one or each of the plurality of objects on a display (e.g., display 152), as described above.

In some examples, method 900 may include additional blocks. For example, method 900 may also detect one or more touches on the surface (e.g., if the surface is a touch-sensitive surface such as surface 200) and select, for each object, an object indicator from at least two different object indicators based on whether the object corresponds to any of the touches (e.g., touches the touch-sensitive surface). In some examples, the display may be a touch-sensitive display, and the method may also determine whether to display an object indicator object for a particular object based on that object's distance from the surface and its distance from the display (e.g., based on the ratio and/or the difference between the two distances).

Although the flowchart of FIG. 10 shows a specific order of performance of certain functionalities, method 900 is not limited to that order. For example, the functionalities shown in succession in the flowchart may be performed in a different order, may be executed concurrently or with partial concurrence, or a combination thereof. In some examples, features and functionalities described herein in relation to FIG. 10 may be provided in combination with features and functionalities described herein in relation to any of FIGS. 1-9.

What is claimed is:

1. A computing system comprising:
a touch-sensitive surface;
a display;
at least one camera to capture an image representing an object disposed between the camera and the touch-sensitive surface; and
a detection engine to:
based at least on the image, determine display coordinates corresponding to the object's projection onto the touch-sensitive surface, wherein the display is not parallel to the touch-sensitive surface;
select an object indicator from at least two different object indicators based at least on whether the object is touching the touch-sensitive surface;
determine to display the object indicator based on a ratio of the object's distance from the touch-sensitive surface and the object's distance from the display when the object is not touching either of the touch-sensitive surface or the display; and
provide the selected object indicator to the display for displaying the selected object indicator at the determined display coordinates on the display.

2. The computing system of claim 1, wherein:
the touch-sensitive surface is to detect a touch; and
the detection engine is further to:
determine whether the touch detected by the touch-sensitive surface is associated with the object.

3. The computing system of claim 2, wherein the object comprises a fingertip.

4. The computing system of claim 1, wherein the display comprises a touch-sensitive display, and the detection engine is further to:
determine whether to display the object indicator based on at least one of the object's distance from the touch-sensitive surface, the object's distance from the touch-sensitive display or a combination of both the object's distance from the touch-sensitive surface and the object's distance from the display.

5. The computing system of claim 4, wherein the detection engine further is to determine whether to display the object indicator based on a difference between the object's distance from the touch-sensitive surface and the object's distance from the display.

6. A method comprising:
determining locations of a plurality of objects, wherein at least one object is touching a touch-sensitive surface or a display and at least one object is not touching either of the touch-sensitive surface or the display;
based at least on the locations, determining for each object in the plurality of objects display coordinates corresponding to coordinates of the object's projection onto the surface;
determine to display an object indicator for the at least one object not touching either of the touch-sensitive surface or display based on a ratio between the object's distance from the touch-sensitive surface and the object's distance from the display; and
for each object in the plurality of objects, display the object indicator at the determined display coordinates on the display.

7. The method of claim 6, the method further comprising:
for each object from the plurality of objects, selecting the object indicator from at least two different object indicators based on whether the object is touching the touch-sensitive surface.

8. The method of claim 6, wherein the determination of the locations is based on a plurality of images obtained from at least one of an RGB camera, an infrared camera, and a depth camera.

9. The method of claim 6, wherein determining whether to display the object indicator is based on a difference between the object's distance from the surface and the object's distance from the display.

10. A non-transitory machine-readable storage medium comprising instructions executable by a processing resource of a computing system comprising a display, the instructions executable to:
- determine three-dimensional coordinates of an object based on at least two images obtained from two different cameras of a plurality of cameras, wherein the plurality of cameras comprises at least an RGB camera, an infrared camera, and a depth camera;
- based on the three-dimensional coordinates of the object, determine two-dimensional display coordinates corresponding to two-dimensional projection coordinates, wherein the two-dimensional projection coordinates correspond to the object's projection onto a surface other than the display's surface;
- determine to display an object indicator based on a ratio of the object's distance from a touch-sensitive surface and the object's distance from the display when the object is not touching either of the touch-sensitive surface or the display; and
- provide for display of the object indicator at the determined display coordinates on the display.

11. The non-transitory machine-readable storage medium of claim 10, wherein the instructions are further executable to:
- receive, from the touch-sensitive surface, touch data representing at least one touch;
- determining whether the touch is associated with the object; and
- selecting the object indicator from at least two different object indicators based on the determination.

12. The non-transitory machine-readable storage medium of claim 11, wherein the instructions are further executable to detect a type of the object, and wherein selecting the object indicator is further based on the type of the object.

13. The non-transitory machine-readable storage medium of claim 10, wherein the instructions are further executable to:
- determine whether to provide for display the object indicator based on a difference between the object's distance from the surface and the object's distance from the display.

* * * * *